Sept. 3, 1968   E. V. GRUMMAN   3,399,866
JACK AND A BASE FOR TRAILERS WHEREIN THERE IS SPHERICAL
SEAT BETWEEN THE JACK AND BASE STRUCTURE
Original Filed July 12, 1965
FIG.1
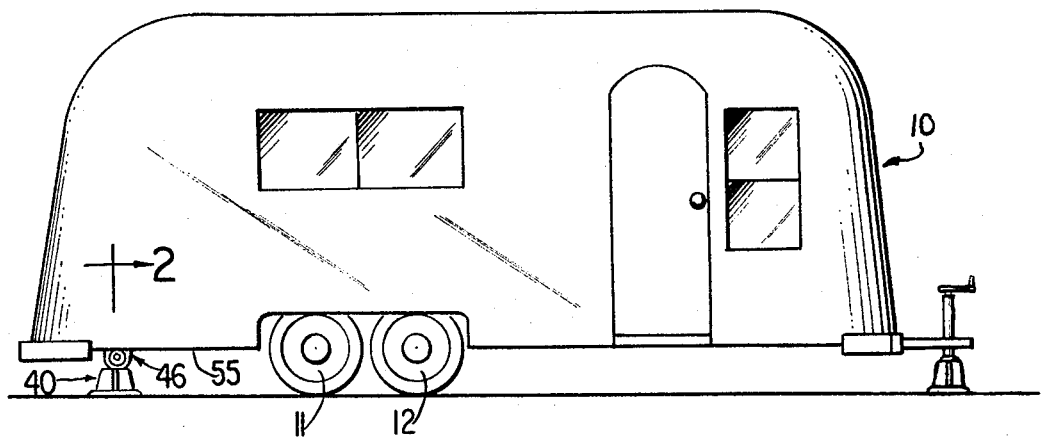
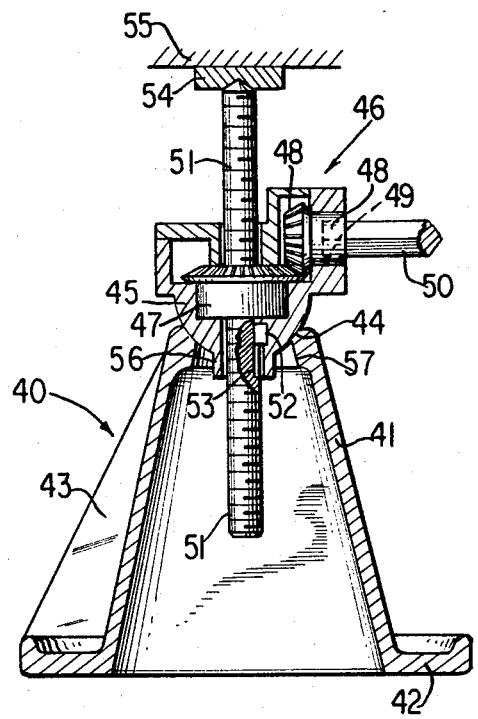
FIG.2
INVENTOR
EUGENE V. GRUMMAN
BY
*Smythe & Moore*
ATTORNEYS

3,399,866
JACK AND A BASE FOR TRAILERS WHEREIN THERE IS SPHERICAL SEAT BETWEEN THE JACK AND BASE STRUCTURE
Eugene V. Grumman, 1337 Burr St., Fairfield, Conn. 06430
Original application July 12, 1965, Ser. No. 471,063, now Patent No. 3,329,402, dated July 4, 1967. Divided and this application June 29, 1967, Ser. No. 650,014
3 Claims. (Cl. 254—101)

ABSTRACT OF THE DISCLOSURE

A jack for supporting and leveling a trailer, the jack having a base with a spherical-like seat, and the jack having a spherical member to fit said seat. The spherical seat arrangement permitting the jack to be placed on an incline to level and support a trailer or the like.

---

This application is a division of application Ser. No. 471,063, filed July 12, 1965, now Patent No. 3,329,402; issued July 4, 1967.

This invention relates to jack stands for supporting house trailers and/or travel trailers and the like after they have been disconnected from a towing vehicle.

House trailers normally include tongue means at their forward end that is adapted to be hitched to connecting means attached to the rear of a towing vehicle. The tongue means of such house trailers and travel trailers usually include some form of screw jack mechanism forming part of the tongue. Normally, they include telescoping tubular members operated by a screw thread that is turned by a crank. The lower end of the movable tubular element is adapted to be moved downwardly by turning the crank until its bottom end contacts a support, which upon continued turning of the crank, raises the front end of the trailer to unhitch it from the towing vehicle.

Various elaborate supporting means have heretofore been produced but they have proved unsatisfactory in many respects. Also, it is quite usual for the owner of a trailer to look around for a rock or stone or any sort of rigid member to place beneath the telescoping tubular members to act as a support. Such improvised supporting means often produce hazardous conditions because they do not bear evenly on the supporting ground, and if the ground level is inclined, it is virtually impossible adequately to support the trailer while it is detached from the towing vehicle.

The principal object of this invention is to provide a simple, inexpensive support that can be stowed in the trailer when not in use.

Another object of the invention is to provide such a support or jack base which will accommodate inclined terrain.

Still another object of the invention is to provide such a support or jack base which will accommodate inclined area capable of working in all soil conditions.

Still another object of the invention is to provide such a self-aligning jack base that will accommodate the tubular jack member permanently attached to the tongue of a house trailer.

A further object of the invention is to provide such a jack base in which means is provided to prevent the tubular jack element from falling off the stand, i.e., so that the center of gravity of the house trailer will always lie within the base of the jack support.

A still further object of the invention is to provide such a jack base that is hollow so that forces applied to it will compact the soil and force it into the center thereof, thereby increasing the load-bearing capacity of the jack base.

Another object of the invention is to provide such a jack base which is made of metal, thereby to provide a better electrical ground connection to the earth.

In one aspect of the invention, a jack base may comprise a generally conical-shaped metallic casting of hollow construction. It may be suitably ribbed for structural reasons, and its base may provide a substantial annular area adapted to contact the earth.

In a further aspect of the invention, the jack base may include an opening at the top for the reception of a hemispherical portion of a housing adapted to support a pair of bevel gears.

In a still further aspect of the invention, one of the bevel gears may have an internal thread adapted to receive a threaded shaft that is splined to the housing. The construction may be such that rotation of the one bevel gear causes the threaded member to reciprocate vertically. The top of the screw may include a plate adapted to contact a flat portion of the undersurface of the trailer truck. In this embodiment, the jack may be employed at the rear of the house trailer in combination with the previously described jack base to ensure proper leveling of the trailer and retaining it in such condition indefinitely. Preferably, two of the jacks just described are located one at each side of the rear of the house trailer so as to ensure proper leveling of the house trailer by the combination of the three jack arrangements.

The above, as well as other objects and novel features of the improved base and jack will become apparent from the following specification and accompanying drawing which are merely exemplary.

In the drawing:

FIG. 1 is a side elevational view of a house trailer supported by jack bases and jacks to which the principles of the present invention have been applied; and FIG. 2 is a sectional elevational view taken substantially along line 2—2 of FIG. 1.

Referring to the drawing, the principles of the invention are shown as applied to a jack base and jacks for supporting and detaching a house trailer 10 from a towing vehicle. In the embodiment disclosed, the house trailer is supported by four wheels, only two 11 and 12 being disclosed. The front end of the house trailer 10 includes a tongue 13 attached to a connector on the rear end of a towing vehicle, as is well known in the art.

The above described structure is the normal construction of the tongues of house trailers and forms no part of the present invention.

Referring to FIG. 2, the principles of the invention are shown as applied to a jack base and jack adapted to be used at the rear of the trailer 10. Preferably two of these jacks are used, one on each side thereof.

The embodiment shown in FIG. 2 may include a base 40 having a frusto-conical, hollow portion 41 and a relatively wide, flanged base 42, with reinforcing ribs 43.

The upper end of base 40 may include a spherical surface 44 adapted to receive a hemispherical portion 45 of a housing 46. Housing 46 may journal a bevel gear 47 having internal threads therein. Housing 46 may also journal a bevel gear 48 in a manner such that it meshes with the gear 47. Gear 48 may include a socket 49 adapted to receive one end 50 of a crank. The internal threads of the gear 47 may receive a screw 51 that is prevented from rotation by a key 52 that slides within a spline 53 axially disposed along the surface of the screw 51. A plate 54 may be attached to the top of screw 51 for bearing against the undersurface 55 of the trailer 10.

By locating one of the bases 40 with its attending jack mechanism on each side of the rear of trailer 10, and by turning the gears 48 of each, the trailer 10 can be leveled on any type of terrain without danger of tipping.

Referring again to FIG. 2, the hemispherical portion 45 of the housing 46 may include a cylindrical portion 56 adapted to cooperate with a surface 57 of the base 40 adjacent the spherical surface 44 thereof. Accordingly, should the trailer 10 begin to tip with the base 40 and its attendant jack mechanism supporting it, the cylindrical member 56 will engage the surface 57, preventing the trailer from falling off the jack mechanism.

Although the various features of the improved base and jack mechanism for house and travel trailers have been shown and described in detail to fully disclose one embodiment of the invention, it will be evident that changes may be in such details, the jack may be used at the front, and certain features may be used without others without departing from the principles of the invention.

What is claimed is:

1. A separable jack and base for a trailer comprising in combination, a hollow casting having upward inwardly tapered walls; an annular flange about the bottom of said base; a spherical seat at the top of said casting; a screw receiving aperture in said seat; a separate reciprocable jack for engaging said trailer and including a housing having a spherical shaped surface complementary to said spherical seat and adapted to engage said seat; rotatable gears within said housing; means to drive said gears; and a screw threaded through one of said gears and being of a size to extend freely through said aperture, said screw being held against rotation and being capable of axial movement.

2. A jack base as set forth in claim 1 wherein the gears are bevel gears.

3. A jack base as set forth in claim 1 including means on the housing adapted to cooperate with means on said base for limiting the angular motion of said screw relative to the centerline of said base.

References Cited

UNITED STATES PATENTS

| | | | |
|---|---|---|---|
| 861,373 | 7/1907 | Lewis | 254—103 |
| 1,390,867 | 9/1921 | Barrett | 254—103 |
| 3,069,924 | 12/1962 | Watanabe et al. | 254—103 X |
| 3,135,497 | 6/1964 | Beck | 254—103 |

FOREIGN PATENTS 931,380   10/1947   France.

OTHELL M. SIMPSON, *Primary Examiner.*

UNITED STATES PATENT OFFICE
CERTIFICATE OF CORRECTION

Patent No. 3,399,866 September 3, 1968

Eugene V. Grumman

It is certified that error appears in the above identified patent and that said Letters Patent are hereby corrected as shown below:

Column 1, line 59, "a support or jack base which will accommodate inclined" should read -- a support which is light-weight and has a large projected --.

Signed and sealed this 13th day of January 1970.

(SEAL)
Attest:

Edward M. Fletcher, Jr.

Attesting Officer

WILLIAM E. SCHUYLER, JR.

Commissioner of Patents